(12) United States Patent
Sakurai et al.

(10) Patent No.: US 8,169,407 B2
(45) Date of Patent: May 1, 2012

(54) KVM SWITCH AND METHOD OF CONTROLLING THE SAME

(75) Inventors: Satoshi Sakurai, Shinagawa (JP);
Katsuji Ideura, Shinagawa (JP);
Kazuhiro Yasuno, Shinagawa (JP);
Fujio Seki, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 900 days.

(21) Appl. No.: 11/984,683

(22) Filed: Nov. 20, 2007

(65) Prior Publication Data

US 2008/0117172 A1 May 22, 2008

(30) Foreign Application Priority Data

Nov. 22, 2006 (JP) .................................. 2006-315304

(51) Int. Cl.
*G06F 3/02* (2006.01)
(52) U.S. Cl. ........................................ 345/168; 710/62
(58) Field of Classification Search .................. 345/168, 345/2.1, 160, 163, 156; 710/62–74; 715/744; 375/211–215, 229–231; 455/14; 178/63 A, 178/70 R, 70 J
See application file for complete search history.

(56) References Cited

U.S. PATENT DOCUMENTS

| | | | |
|---|---|---|---|
| 5,008,636 A * | 4/1991 | Markinson et al. ................ 331/2 |
| 5,721,842 A | 2/1998 | Beasley et al. |
| 6,449,258 B1 * | 9/2002 | Grammel ....................... 370/246 |
| 7,084,795 B2 * | 8/2006 | Smith et al. .................... 341/120 |
| 7,142,619 B2 * | 11/2006 | Sommer et al. ................ 375/345 |
| 7,231,402 B2 * | 6/2007 | Dickens et al. ...................... 1/1 |
| 7,277,104 B2 * | 10/2007 | Dickens et al. ................ 345/691 |
| 7,685,336 B2 * | 3/2010 | Chiang ............................ 710/62 |
| 2005/0024109 A1 * | 2/2005 | Amin ............................. 327/161 |
| 2005/0132087 A1 * | 6/2005 | Glinski et al. ................. 709/238 |
| 2005/0213749 A1 * | 9/2005 | Sakurai et al. ................ 379/413 |
| 2006/0114234 A1 * | 6/2006 | Chiang ........................... 345/168 |
| 2008/0111643 A1 * | 5/2008 | Shen .............................. 331/167 |

FOREIGN PATENT DOCUMENTS

| | | |
|---|---|---|
| JP | 9-219803 | 8/1997 |
| JP | 2003-308063 | 10/2003 |
| JP | 2005-278085 | 10/2005 |

OTHER PUBLICATIONS

Japanese Office Action dated Sep. 6, 2011 issued in corresponding Japanese Application No. 2006-315304.

* cited by examiner

*Primary Examiner* — Alexander Eisen
*Assistant Examiner* — Sanjiv D Patel
(74) *Attorney, Agent, or Firm* — Staas & Halsey LLP (57) ABSTRACT

A KVM switch including server units that are respectively connected to computers units, user units that are respectively connected to input-output units inputting and outputting a signal to the computer units, and a main unit that connects the server units and the user units selectively. The input-output unit switches between the computer units where the signal is input and output. The server unit has a first reference signal generator that generates a first reference signal used for a distortion control of a picture signal. The main unit has a first controller receiving the first reference signal and controlling the distortion of the picture signal and a second reference signal generator generating a second reference signal used for the distortion control of the picture signal. The user unit has a second controller that receives the second reference signal and controls the distortion of the picture signal.

9 Claims, 12 Drawing Sheets

KVM SWITCH AND METHOD OF CONTROLLING THE SAME

BACKGROUND OF THE INVENTION

1. Field of the Invention

Various embodiments of the present invention generally relate to a keyboard, video, mouse (KVM) switch that controls computers with an input-output unit having a keyboard, a mouse and a display.

2. Description of the Related Art

A KVM switch is connected between an input-output unit and computers. The KVM switch makes one of the connections between the input-output unit and the computers an active. A user selects and uses one of the computers that is to be connected by using the KVM switch.

Figure 1:
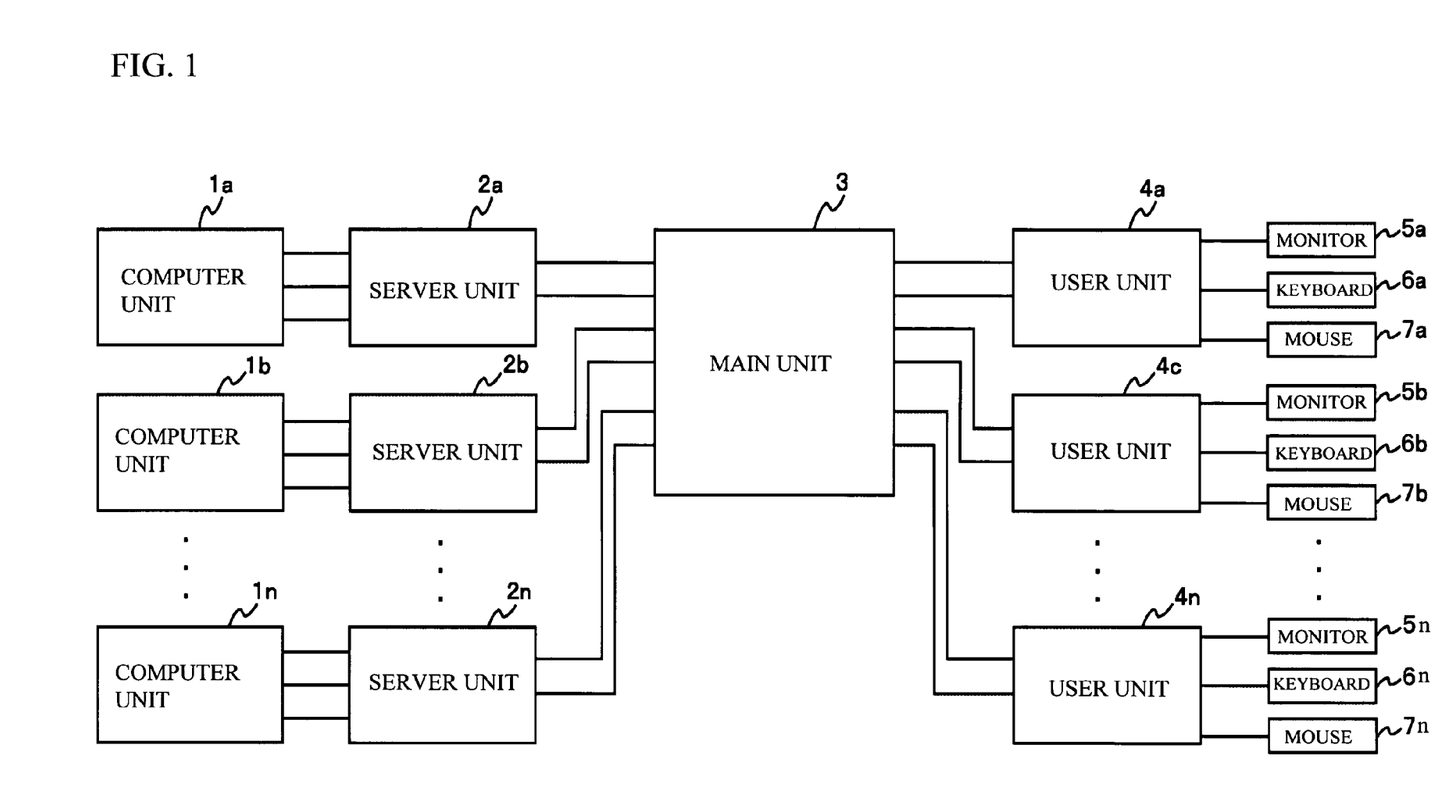
FIG. 1 illustrates a whole structure of a KVM switch.

FIG. 1 illustrates a structure of a conventional KVM switch. The KVM switch has server units 2a through 2n ("n" is a given value), user units 4a through 4n ("n" is a given value), and a main unit 3. Hereinafter, a given one of the server units is referred to as a server unit 2. A given one of the user units is referred to as a user unit 4.

The server unit 2 is provided on the side of computer units 1a through 1n ("n" is a given value). Hereinafter, a given one of the computers is referred to as a computer unit 1. The user unit 4 is provided on the side of input-output units such as monitors 5a through 5n ("n" is a given value), keyboards 6a through 6n ("n" is a given value), and mouses 7a through 7n ("n" is a given value). Hereinafter, a given one of the monitors is referred to as a monitor 5. A given one of the keyboards is referred to as a keyboard 6. A given one of the mouses is referred to as a mouse 7. The main unit 3 is provided between the units, and has a switch that switches connections between the computer unit 1 and the input-output unit.

A picture signal is output from the computer unit 1, and is fed into the main unit 3 via the server unit 2. In the main unit 3, a matrix switch 12 selects the user unit 4 to be connected. The picture signal is fed into the monitor 5 via the user unit 4.

There is a case where a cable length between the main unit 3 and the user unit 4 is a few hundreds meters. In this case, there is occurred a high degradation and a delay in the picture signal fed into the user unit. Therefore, there is provided a picture signal controller that controls a picture signal in the user unit.

Figure 2:
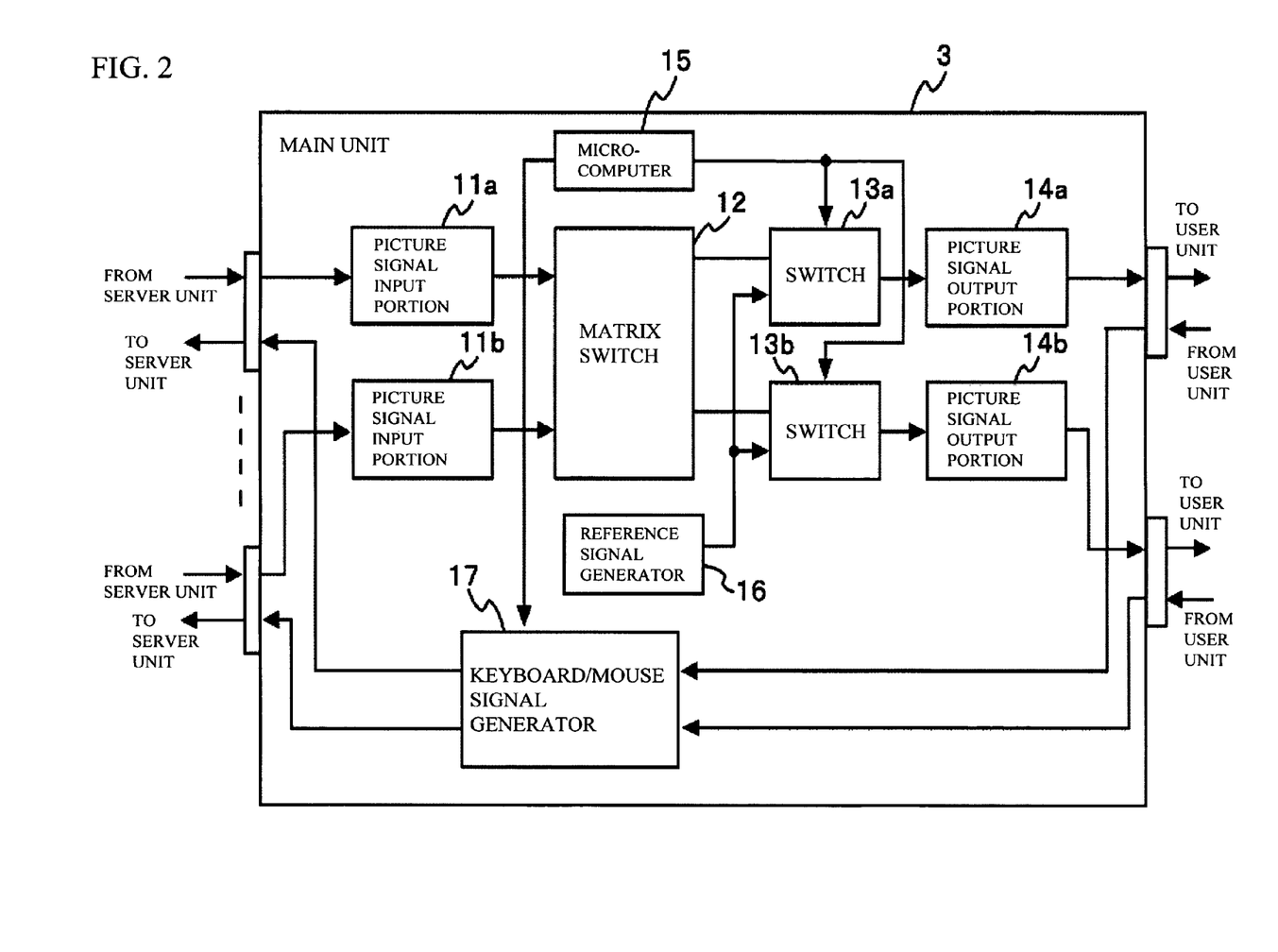
FIG. 2 illustrates a structure of a conventional main unit.

FIG. 2 illustrates a structure of the main unit 3. The main unit 3 has picture signal input portions 11a through 11n ("n" is a given value), the matrix switch 12, switches 13a through 13n ("n" is a given value), picture signal output portions 14a through 14n ("n" is a given value), a microcomputer 15, a reference signal generator 16 and a keyboard/mouse signal generator 17.

Picture signals from the server units 2a through 2n are fed into the picture signal input portion 11a through 11n. The matrix switch 12 redirects the output of the picture signal. The switches 13a through 13b output one of the picture signal from the matrix switch 12 and a reference signal from the reference signal generator 16. The picture signal output portions 14a through 14n output the picture signals from the switches 13a through 13n or the reference signal to the user unit 4. The microcomputer 15 controls the switches 13a through 13n and the keyboard/mouse signal generator 17. The reference signal generator 16 generates the reference signal. The keyboard/mouse signal generator 17 generates a control signal of the keyboard/mouse.

FIG. 2 shows the picture signal input portions 11a and 11b of the picture signal input portions 11a through 11n, shows the switches 13a and 13b of the switches 13a through 13n, and shows the picture signal output portions 14a and 14b of the picture signal output portions 14a through 14n.

The microcomputer 15 controls the switches 13a and 13b so that the reference signal from the reference signal generator 16 is fed into the picture signal output portions 14a and 14b, at a controlling timing of the picture signal.

Figure 3:
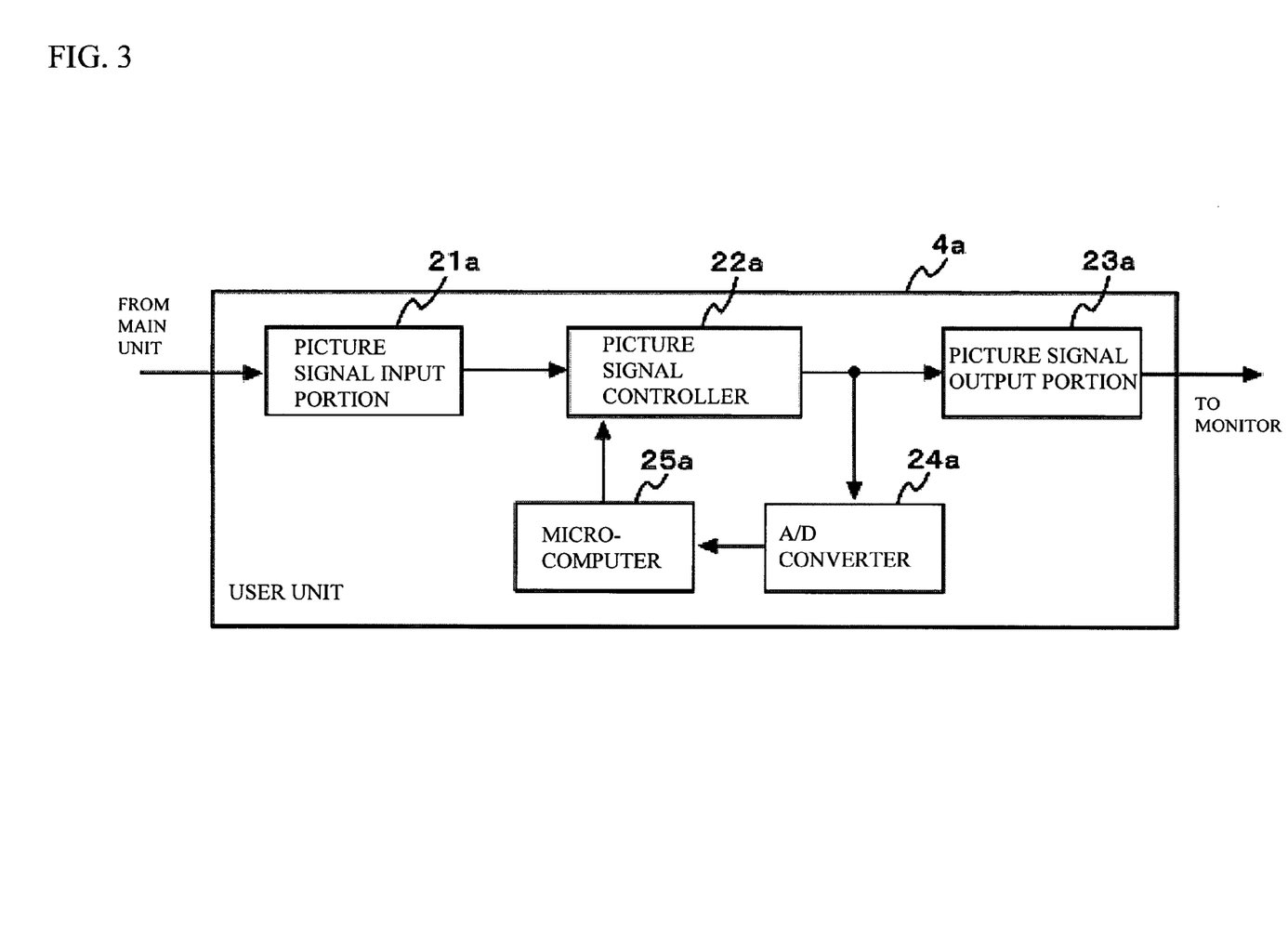
FIG. 3 illustrates a structure of a conventional user unit.

FIG. 3 illustrates a structure of the user unit 4a of the user units 4. The user unit 4a has a picture signal input portion 21a, a picture signal controller 22a, a picture signal output portion 23a, an A/D converter 24a and a microcomputer 25a.

When a reference signal is output from the main unit 3, the user unit 4a receives the reference signal with the picture signal input portion 21a and outputs the reference signal to the picture signal controller 22a. The picture signal controller 22a outputs the reference signal to the picture signal output portion 23a.

The A/D converter 24a A/D converts the reference signal from the picture signal controller 22a, and outputs the reference signal to the microcomputer 25a. The microcomputer 25a controls the picture signal controller 22a so that an output signal from the picture signal controller 22a is optimized based on an output level of the reference signal.

Japanese Patent Application Publication No. 2005-278085 (hereinafter referred to as Document 1) discloses a system that has a reference signal generator in a transmitter and controls a picture quality automatically in a receiver.

Japanese Patent Application Publication No. 9-219803 (hereinafter referred to as Document 2) discloses a cable compensator that has a reference signal generator in a transmitter and controls a gain automatically in a receiver.

A distance between the server unit and the main unit is longer or shorter as well as a distance between the main unit and a user unit, in a case where the KVM switch is structured with the server unit, the main unit and the user unit.

The KVM switch controls a gain of the picture signal controller 22a, in view of a given distance between each of the units. A signal voltage level is not reduced to a required level and a halation may be occurred if the distance between the server unit and the user unit is extremely short, even if the gain of the picture signal controller 22a is controlled. In contrast, there is a problem that a desirable signal voltage level may not be obtained in a case where the signal voltage level is controlled between the main unit and the user unit in a conventional method, if the distance between the server unit and the main unit is longer. And the arts disclosed in Document 1 and Document 2 do not solve the problem.

SUMMARY OF THE INVENTION

The present invention provides a KVM switch that optimizes an output signal level in spite of a distance between connected units, and provides a controlling method of the KVM switch.

According to an aspect of the present invention, preferably, there is provided a KVM switch including server units that are respectively connected to computers units, user units that are respectively connected to input-output units inputting and outputting a signal to the computer units, and a main unit that connects the server units and the user units selectively. The input-output unit switches between the computer units where the signal is input and output. The server unit has a first reference signal generator that generates a first reference signal used for a distortion control of a picture signal. The main unit has a first controller receiving the first reference signal and controlling the distortion of the picture signal and a second reference signal generator generating a second reference signal used for the distortion control of the picture signal. The user unit has a second controller that receives the second reference signal and controls the distortion of the picture signal.

With the structure, the first controller is controlled between the server unit and the main unit, and the second controller is controlled between the main unit and the user unit. The distortion is thus controlled in two steps. It is therefore possible to optimize the output signal level in spite of a distance between the units connected to each other.

According to another aspect of the present invention, preferably, there is provided a method of controlling a KVM switch having server units that are respectively connected to computers units, user units that are respectively connected to input-output units, and a main unit that connects the server units and the user units selectively, including: generating a first reference signal used for a distortion control of a picture signal with the server unit; receiving the first reference signal with the main unit; controlling the distortion of the picture signal with the main unit; generating a second reference signal used for the distortion control of the picture signal with the main unit; receiving the second reference signal with the user unit; and controlling the distortion of the picture signal with the user unit.

With the method, it is possible to optimize an output signal level in spite of a distance between the units connected to each other

BRIEF DESCRIPTION OF THE DRAWINGS

Preferred embodiments of the present invention will be described in detail with reference to the following drawings, wherein.

DESCRIPTION OF THE PREFERRED EMBODIMENTS

A description will now be given, with reference to the accompanying drawings, of embodiments of the present invention.

(First Embodiment)

A KVM switch in accordance with a first embodiment has the server unit 2 provided on the side of the computer unit 1, the user unit 4 provided on the side of the input-output unit such as the keyboard 6, the mouse 7, the monitor 5 and so on, and the main unit 3 that is provided between the units and switches connections between the computer unit 1 and the input-output unit, as shown in FIG. 1.

Figure 4:
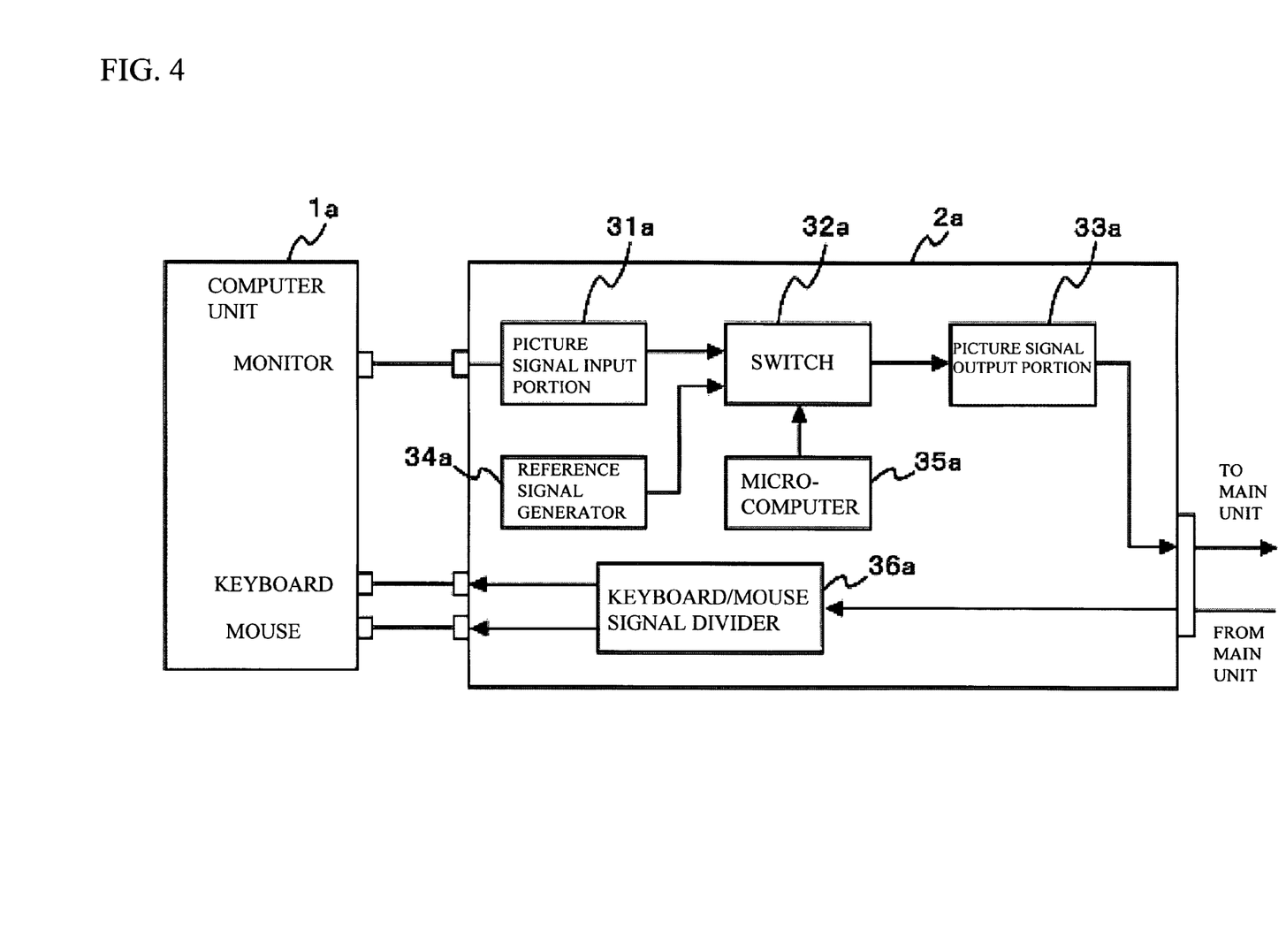
FIG. 4 illustrates a structure of a server unit.

FIG. 4 illustrates a structure of the server unit 2a. The other server units have the same structure as that of the server unit 2a. An explanation of the other server units is omitted, because a description will be given of an explanation of the server unit 2a.

The server unit 2a has a picture signal input portion 31a, a switch 32a, a picture signal output portion 33a, a reference signal generator 34a, a microcomputer 35a, and a keyboard/mouse signal divider 36a.

A picture signal from the computer unit 1a is fed into the picture signal input portion 31a in the server unit 2a and is output to the switch 32a. The switch 32a outputs the picture signal to the picture signal output portion 33a. The picture signal is output to the main unit 3 from the picture signal output portion 33a.

A keyboard/mouse control signal is transmitted between the user unit 4 and the server unit 2 with one cable. The keyboard/mouse control signal fed into the server unit 2a is divided into a keyboard control signal and a mouse control signal at the keyboard/mouse signal divider 36a. The keyboard control signal and the mouse control signal are output to cables different from each other. The keyboard signal is fed into a keyboard signal input terminal. The mouse signal is fed into a mouse signal input terminal.

The server unit 2a has the reference signal generator 34a and the microcomputer 35a. The reference signal generator 34a generates a reference signal in at least one of the main unit 3 and the user unit 4, the reference signal being used for controlling a distortion of the picture signal. The microcomputer 35a controls the switch 32a so that a signal fed into the picture signal output portion 33a is switched between the picture signal and the reference signal.

Figure 5:
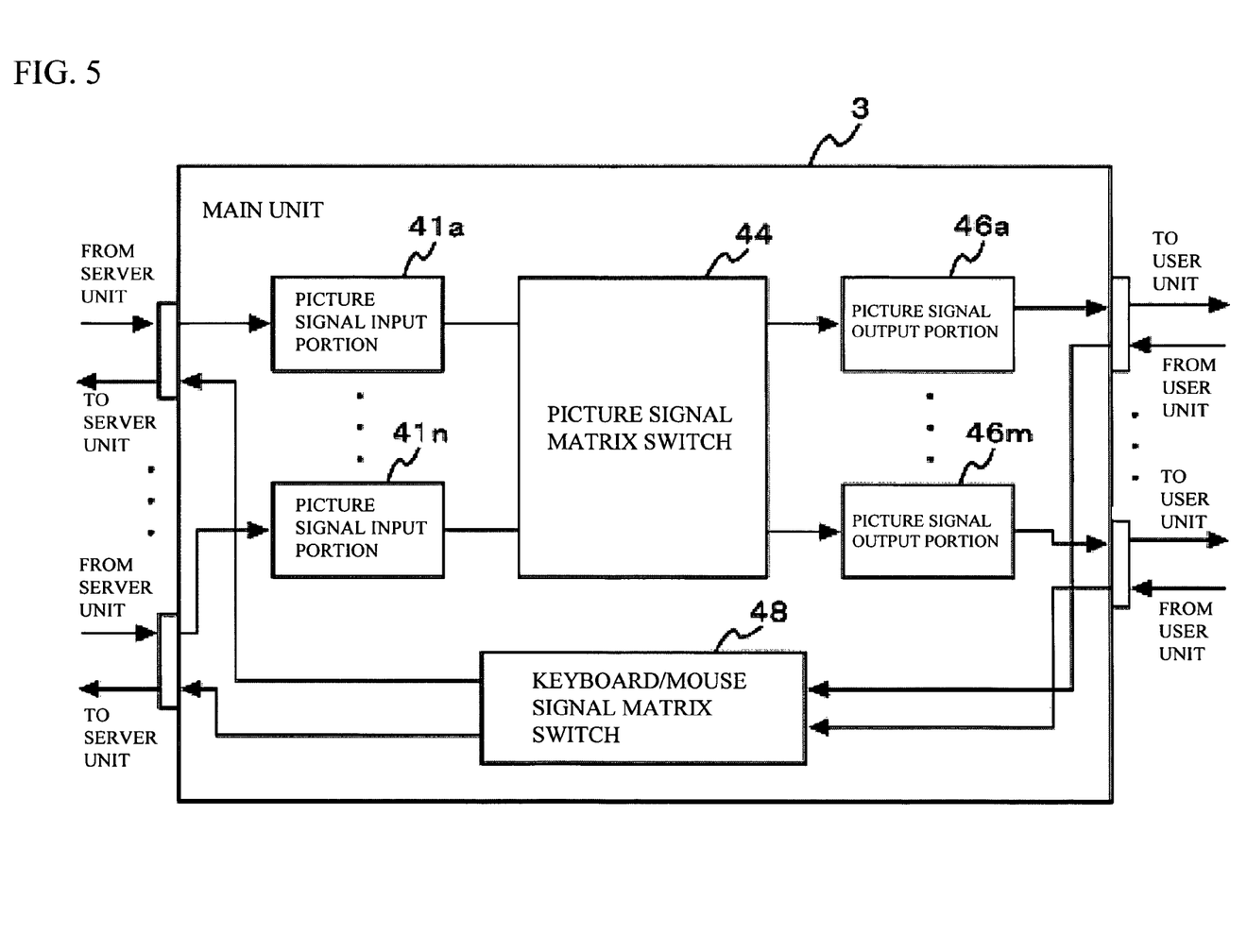
FIG. 5 illustrates a structure of a main unit.

FIG. 5 illustrates a structure of the main unit 3. The main unit 3 is structured according to the server units 2a through 2n. The main unit 3 has picture signal input portions 41a through 41n ("n" is a given value) into which the picture signal from each of the server units is fed, a picture signal matrix switch 44, picture signal output portions 46a through 46m ("m" is a given value) that are provided respectively according to each of the user units, and a keyboard/mouse signal matrix switch 48.

Each of the picture signals from the server units 2a through 2n is fed into each of the picture signal input portions 41a through 41n, and is fed into the picture signal matrix switch 44. The picture signal matrix switch 44 selects between the picture signal output portions 46a through 46m to which the picture signal is transmitted. The picture signal output portions 46a through 46m output the picture signal to the corresponding user units 4a through 4m.

The main unit 3 in accordance with the embodiment outputs the reference signals from the server units 2a through 2n to the user units 4a through 4m, as well as a normal picture signal.

Figure 6:
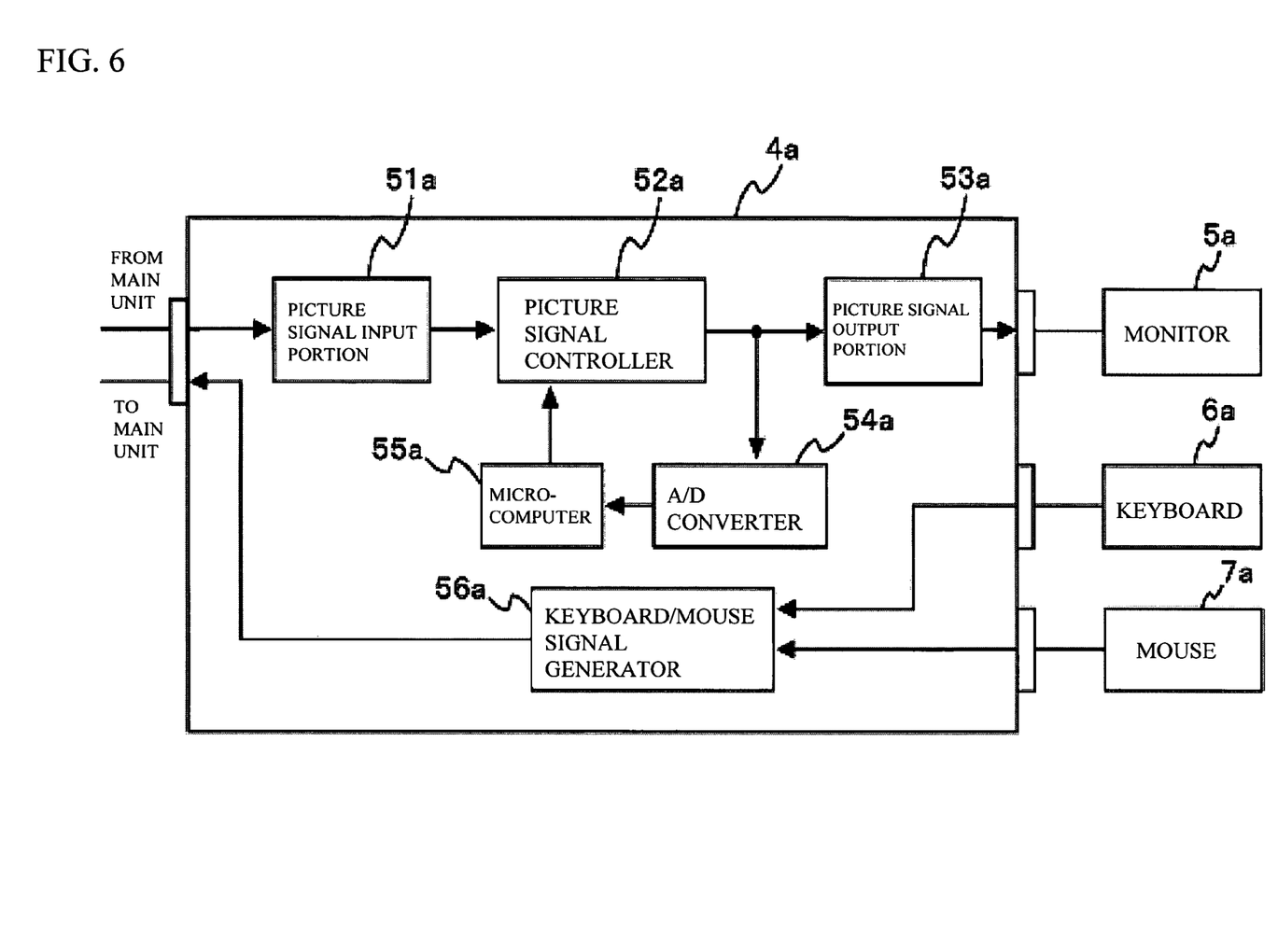
FIG. 6 illustrates a structure of a user unit.

FIG. 6 illustrates a structure of the user unit 4a. The other user units have the same structure as that of the user unit 4a. An explanation of the other server units is omitted, because a description will be given of an explanation of the user unit 4a.

The user unit 4a has a picture signal input portion 51a, a picture signal controller 52a, and a picture signal output portion 53a. The picture signal from the main unit 3 is fed into the picture signal input portion 51a. The picture signal controller 52a controls a signal level of the picture signal. The picture signal output portion 53a outputs the picture signal of which signal level is controlled. The user unit 4a has an A/D converter 54a, and a microcomputer 55a. The A/D converter 54a converts a reference signal from the picture signal controller 52a into a digital signal. The microcomputer 55a controls a signal output level of the picture signal controller 52a based on the digitally converted reference signal.

The user unit 4a has a keyboard/mouse signal generator 56a. The keyboard/mouse signal generator 56a generates a control signal composed of a keyboard control signal and a mouse control signal. The generated signal is transmitted to the main unit 3 and the server unit 2 through one cable.

The KVM switch in accordance with the embodiment has a reference signal generator 34 in the server unit 2 as shown in FIG. 4, and controls a signal distortion of the picture signal with the user unit 4. The user unit 4a A/D converts the reference signal from the picture signal controller 52a in the A/D converter 54a, and calculates an output voltage level of the reference signal and a distortion amount such as a delay in the microcomputer 55a. The user unit 4a controls the picture signal controller 52a based on the calculated distortion amount.

It is possible to control the signal distortion such as a picture quality between the server unit 2 and the user unit 4, if the server unit 2 has the reference signal generator 34. It is therefore possible to connect the server unit 2 and the user unit 4 directly and to transmit and receive a data therebetween, even if the main unit is out of order because of some reason and is inoperative.

(Second Embodiment)

Figure 7:
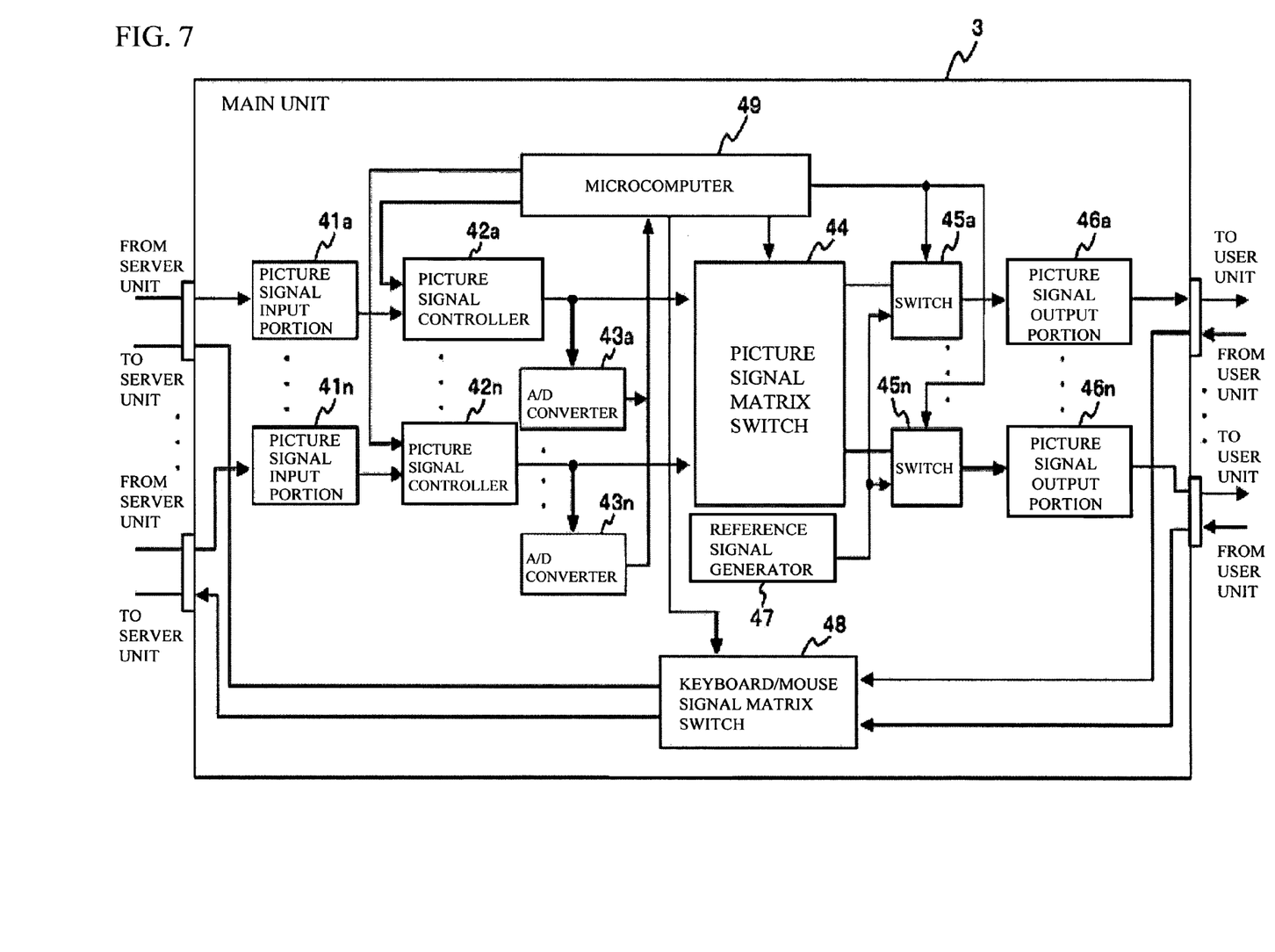
FIG. 7 illustrates a main unit in accordance with a second embodiment.

FIG. 7 illustrates a structure of the main unit 3 in accordance with a second embodiment. In this embodiment, the main unit 3 receives a reference signal (a first reference signal) from the server unit 2, and controls a picture signal. The main unit 3 has picture signal controllers 42a through 42n ("n" is a given value), A/D converters 43a through 43n ("n" is a given value), and a microcomputer 49. These components are referred to as a first controller. A method of correcting a signal distortion with the components is described in the first embodiment.

The main unit 3 has a reference signal generator 47 in order to control the picture signal between the main unit 3 and the user unit 4. FIG. 6 illustrates a structure of the user unit 4. The user unit 4 receives a reference signal (a second reference signal) and controls the picture signal controller 52a. The picture signal controller 52a, the A/D converter 54a and a microcomputer 55 correspond to a second controller.

When a distance between the server unit 2 and the main unit 3 is long, it is not possible to completely control the picture signal between the main unit and the server unit. In this case, a gain or a delay of a signal is corrected between the server unit 2 and the main unit 3 and between the main unit 3 and the user unit 4. That is, a picture signal controller 42 in the main unit 3 and a picture signal controller 52 in the user unit 4 are controlled. It is therefore possible to optimize a level of an output signal in spite of a distance between the computer unit 1 to be connected and the input-output unit.

In addition, a signal voltage level is set in the KVM switch, in view of a given distance between each of the units. A signal voltage level is not reduced to a required level and a halation may be occurred if the distance between the units is extremely short, even if the gain of the picture signal controller 52 in the user unit 4 is controlled. It is however possible to optimize the signal voltage level and to restrain the halation, when the picture signal controller 42 in the main unit 3 and the picture signal controller 52 in the user unit 4 are controlled.

And, a differential is generated between electrical power levels according to the computer unit 1 to be connected, because the server unit 2 receives the electrical power from the computer unit 1. It is therefore possible to control the picture quality and to obtain a clear picture quality, when the server unit 2 is connected to one of the computer units 1. However, there is a problem that it is not possible to completely control the gain and the picture quality, when the server unit 2 is connected to another computer unit instead of the computer unit 1. And so, it is possible to solve the problem, when the gain of the picture signal controller 42 of the main unit 3 is increased and the signal voltage level is increased in a case where the electrical power level is low and the gain is not maintained.

Figure 8:
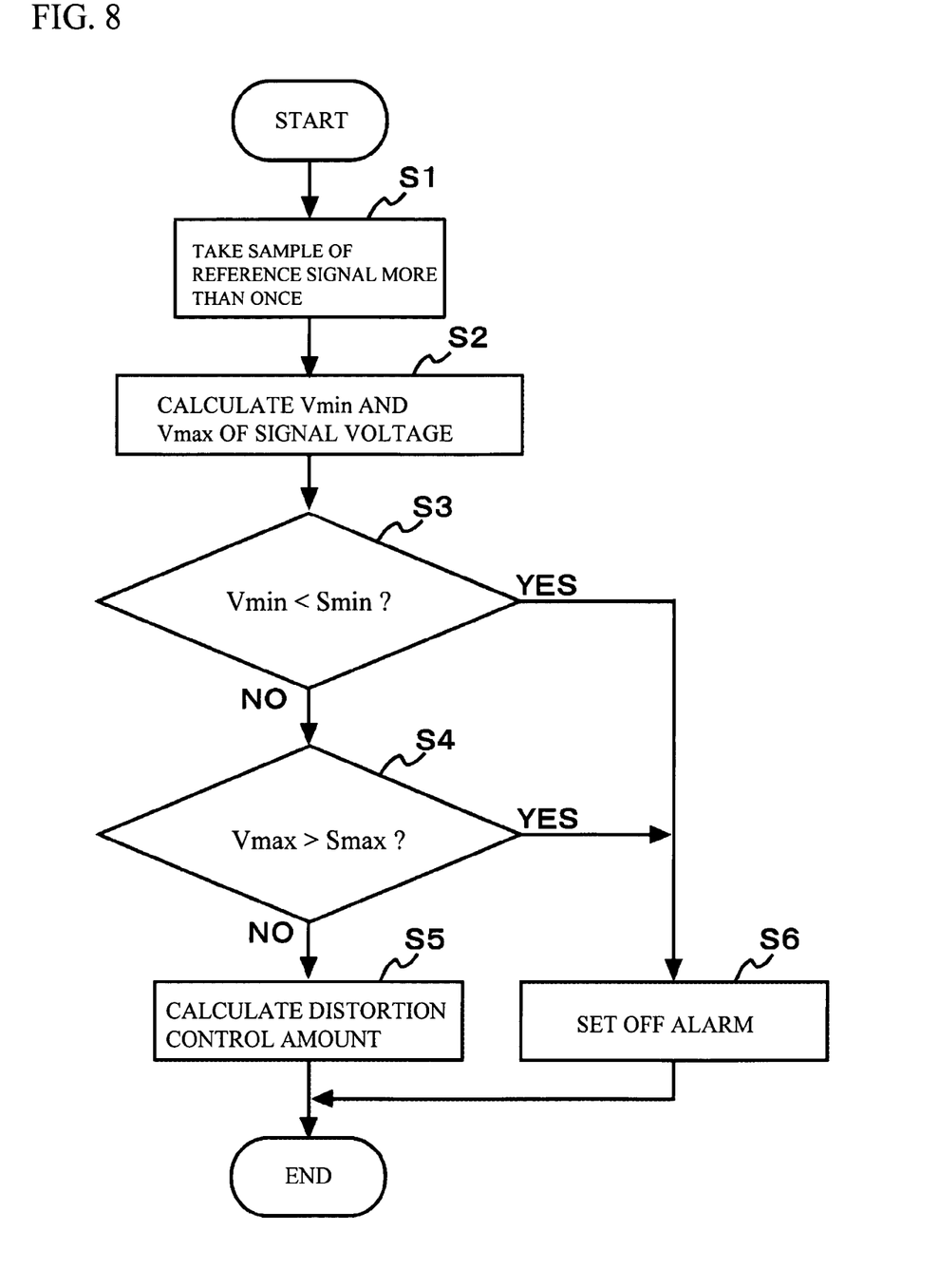
FIG. 8 illustrates a flowchart showing a procedure of a microcomputer of a main unit.

FIG. 8 illustrates a determination flow that determines whether the microcomputer 49 of the main unit 3 controls the picture signal controller 42.

The picture signal controller 42a (or 42b) receives a reference signal from the server unit 2. The picture signal controller 42a (or 42b) controls the reference signal and outputs the controlled reference signal to the picture signal matrix switch 44.

The A/D converter 43a (or 43b) A/D converts the picture signal from the picture signal controller 42a (or 42b), and outputs the converted signal to the microcomputer 49. The microcomputer 49 receives the signal that is controlled in the picture signal controller 42a (or 42b) as a sample (step S1).

The microcomputer 49 stores the sampling data, and obtains a minimum value (Vmin) and a maximum value (Vmax) of the signal voltage (step S2). Next, the microcomputer 49 compares the minimum value Vmin with a first threshold (5 min). If the minimum value Vmin is smaller than the first threshold 5 min (step S3/YES), the microcomputer 49 determines that the distortion cannot be controlled (step S6) and sets off an alarm.

If the minimum value Vmin is larger than the first threshold 5 min (step S3/NO), the microcomputer 49 compares the maximum value Vmax with a second threshold (Smax) (step S4). If the maximum value Vmax is larger than the second threshold Smax (step S4/YES), the microcomputer 49 determines that the distortion can not be controlled (step S6), and sets off the alarm. If the maximum value Vmax is smaller than the second threshold Smax (step S4/NO), the microcomputer 49 calculates the distortion control amount and controls the picture signal controller 42a (or 42b).

Figure 9:
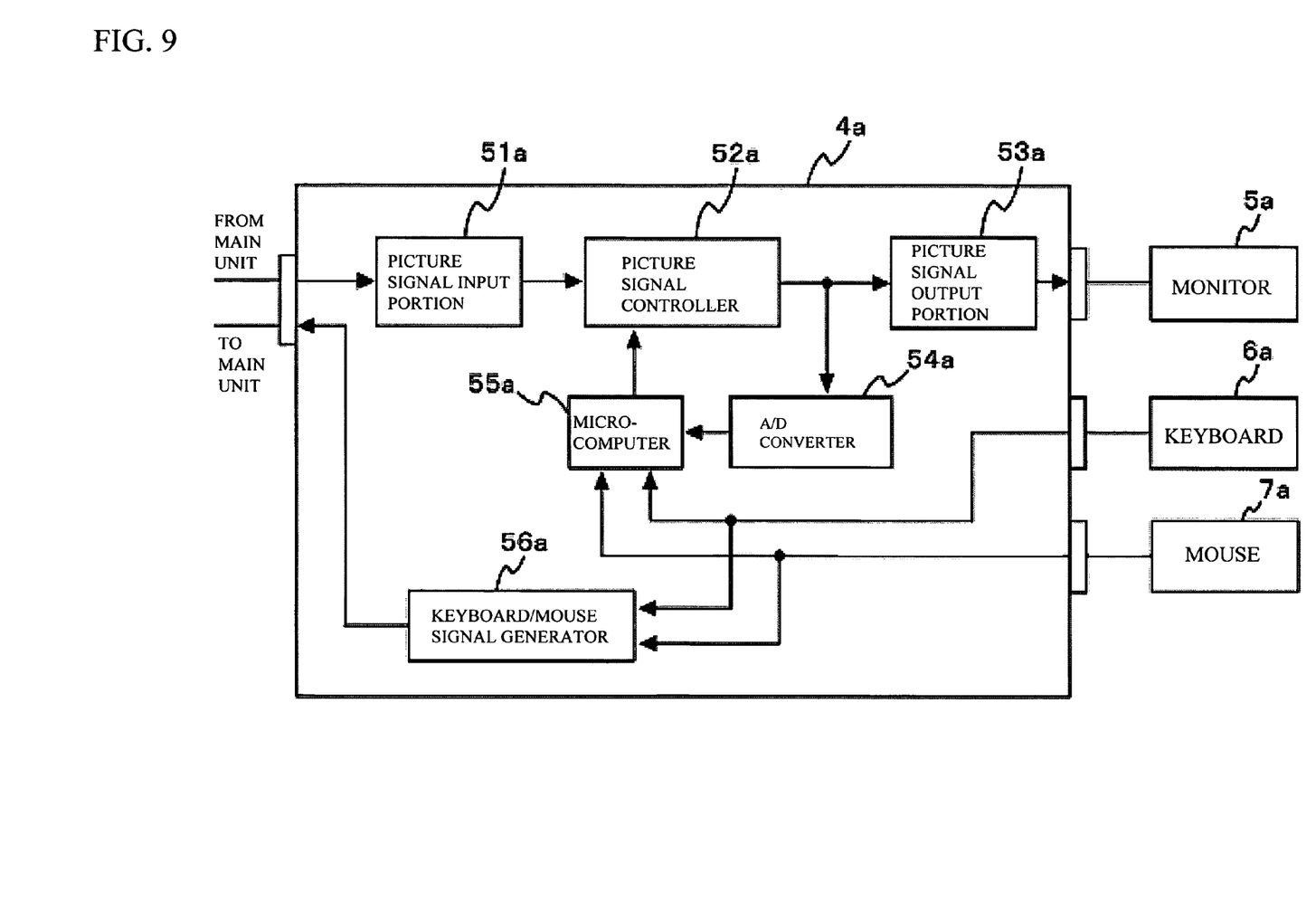
FIG. 9 illustrates a user unit further having a structure in which a picture signal controller of a user unit is manually controlled.
Figure 10:
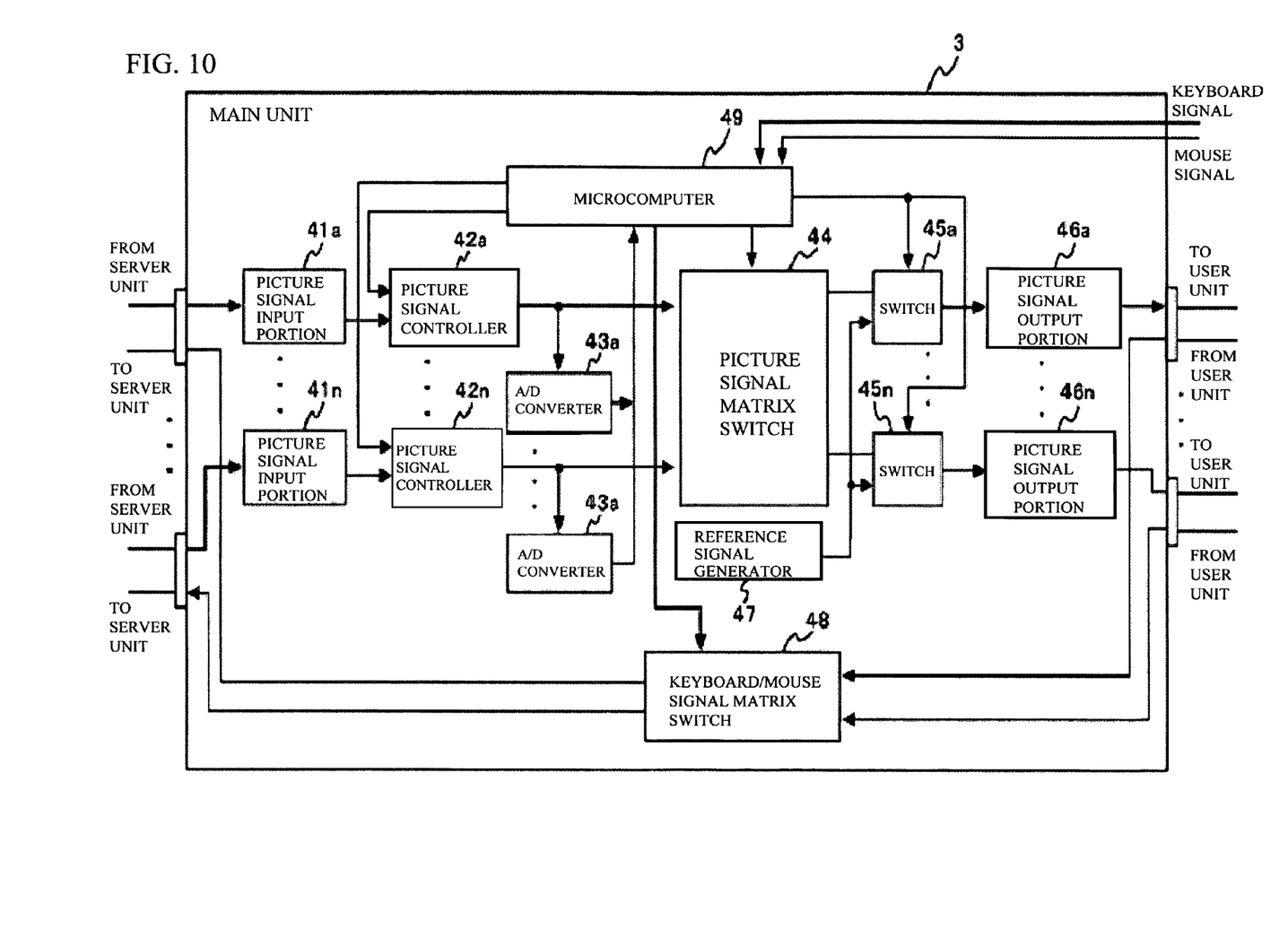
FIG. 10 illustrates a main unit further having a structure in which a picture signal controller of a main unit is manually controlled.

The user may manually control the distortion with the mouse 7a and the keyboard 6a, in addition to the control of the picture signal controller 52 with the microcomputer 55 in the user unit 4 and the control of the picture signal controller 42 with the microcomputer 49 in the main unit 3. FIG. 9 illustrates a structure of the case. The microcomputer 55a receives a control signals from the keyboard 6a and the mouse 7a, and corrects the control amount of the picture signal controller 52a. And, the microcomputer 49 receives the control signals from the keyboard 6a and the mouse 7a, and corrects the control amount of the picture signal controllers 42a through 42n, as shown in FIG. 10.

Figure 11:
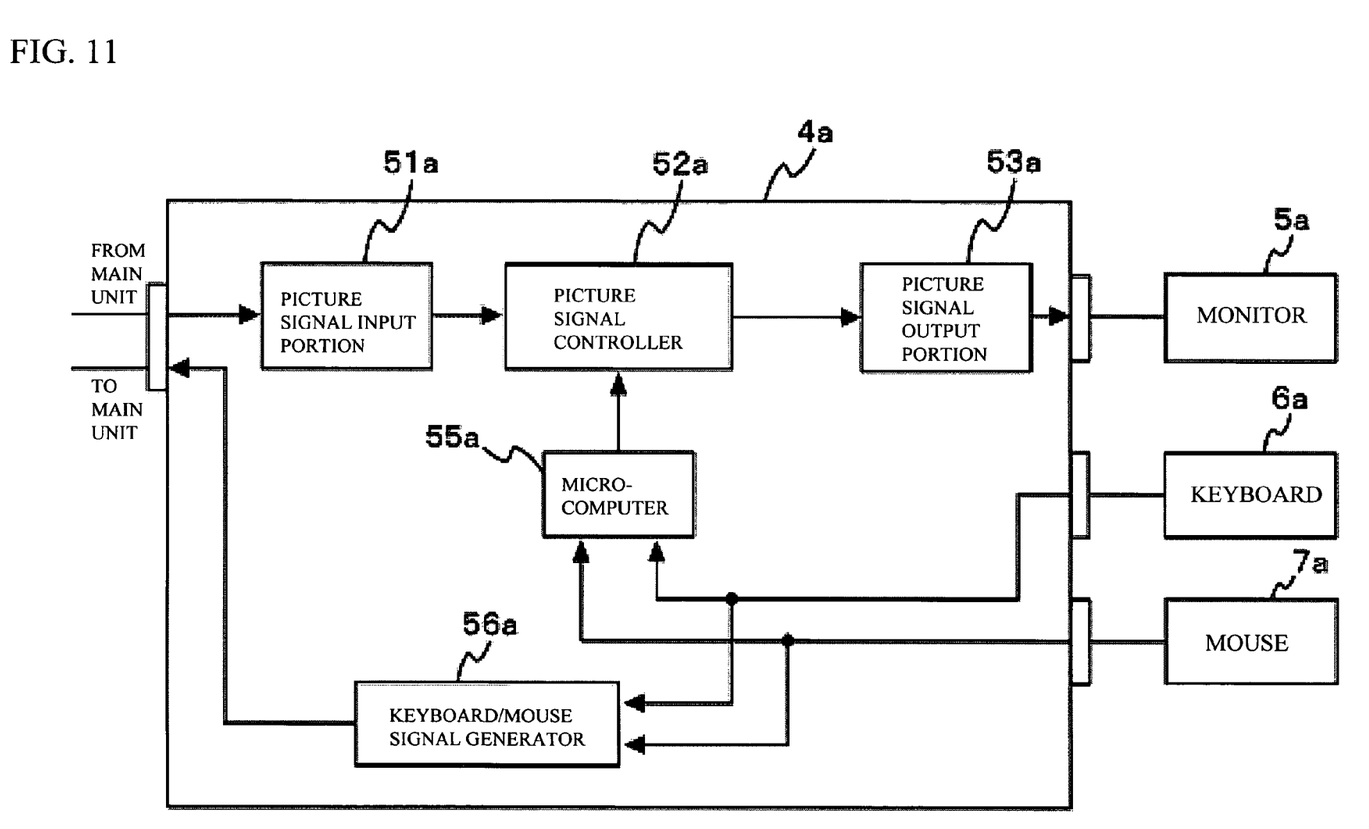
FIG. 11 illustrates a structure of a user unit in which a picture signal controller of a user unit is controlled only manually.
Figure 12:
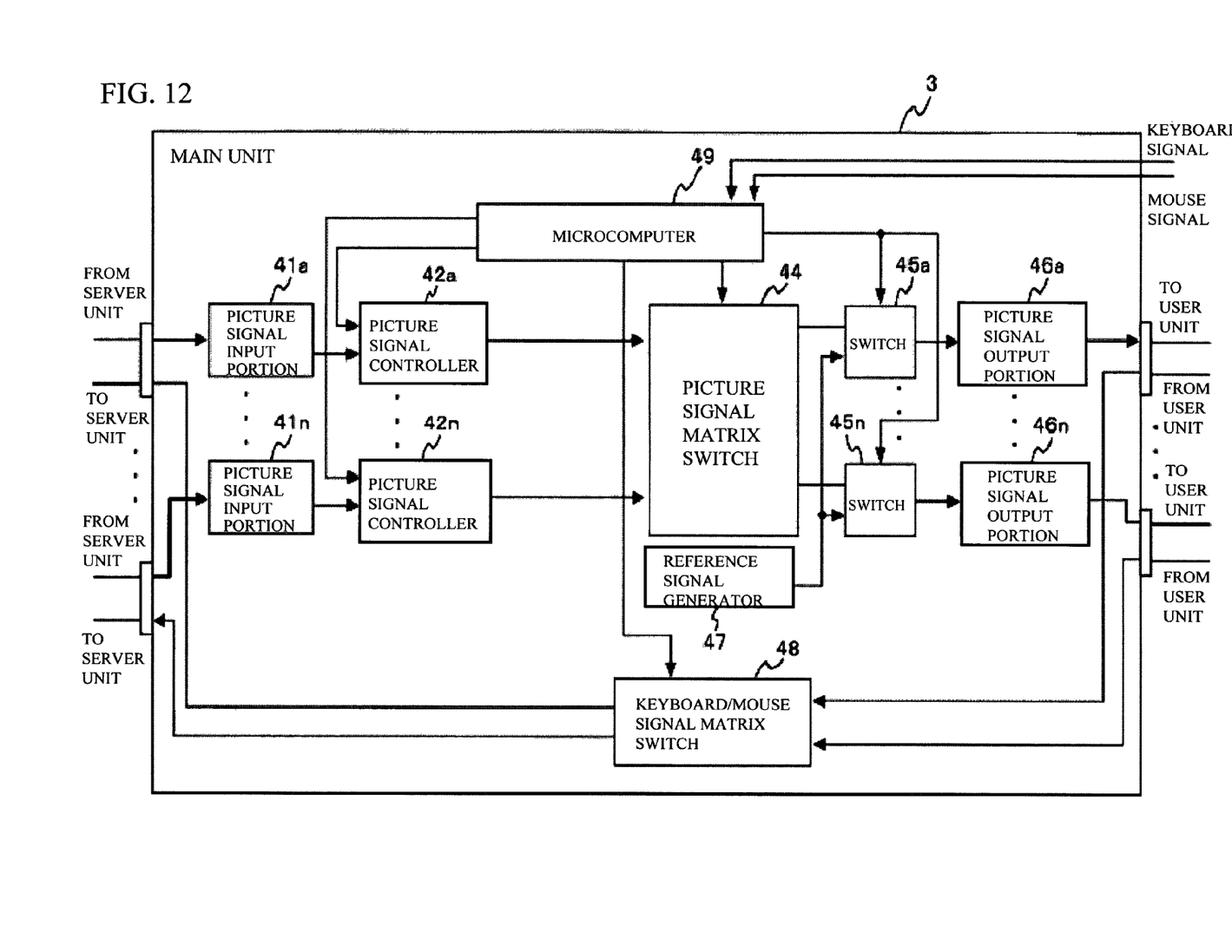
FIG. 12 illustrates a structure of a main unit in which a picture signal controller of a main unit is controlled only manually.

As shown in FIG. 11 and FIG. 12, the microcomputers 55 and 49 may not control the picture signal controllers 52 and 42, and the picture signal controllers 52 and 42 may be controlled only manually. The microcomputers 55 and 49 receive the control signal from the keyboard 6a and the mouse 7a, and control the picture signal controllers 52 and 42 based on the control signals.

While the above description constitutes the preferred embodiments of the present invention, it will be appreciated that the invention is susceptible of modification, variation and change without departing from the proper scope and fair meaning of the accompanying claims.

The present invention is based on Japanese Patent Application No. 2006-315304 filed on Nov. 22, 2006, the entire disclosure of which is hereby incorporated by reference.

What is claimed is:

1. A KVM switch comprising:
server units that are respectively connected to computers units;
user units that are respectively connected to input-output units inputting and outputting a signal to the computer units; and
a main unit that connects the server units and the user units selectively, wherein:
an input-output unit switches between the computer units where the signal is input and output;
a picture signal from a computer unit is fed into the input-output unit via a server unit, the main unit and a user unit in accordance with the following order:
the server unit has a first reference signal generator that generates a first reference signal used for a distortion control of the picture signal and a first switch device to select the picture signal from the computer unit or the first reference signal from the first reference signal generator for outputting to the main unit;
the main unit has a first controller that receives the first reference signal and the picture signal in common, and outputs the first reference signal or the picture signal with a controlled output voltage level, a first microcomputer which receives the first reference signal output from the first controller, and controls the output voltage level of the first controller based on the received first reference signal, a second reference signal generator generating a second reference signal used for the distortion control of the picture signal and a second switch device to select the picture signal from the server unit or the second reference signal from the second reference signal generator for outputting to the user unit; and
the user unit has a second controller that receives the second reference signal and the picture signal in common, a second microcomputer which receives the second reference signal output from the second controller, and controls the output voltage level of the second controller based on the received second reference signal.

2. The KVM switch as claimed in claim 1, wherein the first controller and the second controller control the picture signal according to a calculated distortion amount of the received first and second reference signals respectively.

3. The KVM switch as claimed in claim 1, wherein at least one of the first controller and the second controller receives an operation input from the input-output unit and controls the distortion of the picture signal.

4. The KVM switch as claimed in claim 2, wherein at least one of the first controller and the second controller measures the distortion amount of a signal more than once, determines at least one of a maximum value and a minimum value of the distortion amount, and determines that the distortion of the picture signal cannot be controlled if at least one of the maximum value and the minimum value is out of a given range.

5. A method of controlling a KVM switch having server units that are respectively connected to computers units, user units that are respectively connected to input-output units, and a main unit that connects the server units and the user units selectively, comprising:
transmitting a picture signal from a computer unit to an input-output unit via a server unit, the main unit and a user unit in the following order, with a controlled output voltage level of a first controller in the main unit and a second controller in the user unit;
generating a first reference signal used for a distortion control of a picture signal with the server unit;
switching an output signal of the server unit from the picture signal received from the computer unit to the first reference signal;
receiving the first reference signal with the first controller in the main unit;
sending the first reference signal from the first controller to a first microcomputer in the main unit;
controlling the output voltage level of the first controller based on the received first reference signal with the first microcomputer;
generating a second reference signal used for the distortion control of the picture signal with the main unit;
switching an output signal of the main unit from the picture signal received from the server unit to the second reference signal; and
receiving the second reference signal with the second controller in the user unit;
sending the second reference signal from the second controller to a second microcomputer in the user unit; and
controlling the output voltage level of the second controller based on the received second reference signal with the second microcomputer.

6. The KVM switch as claimed in claim 4, wherein at least one of the first controller or second controller sets off an alarm when at least one of the maximum value and the minimum value is out of a given range.

7. The KVM switch as claimed in claim 1, wherein a user manually controls distortion of the picture signal using a keyboard and mouse.

8. A method of controlling signal distortion using a main computer unit, comprising:
receiving a first reference signal and a picture signal in common from at least one server unit using a first controller included in the main computer unit;
outputting the first reference signal or the picture signal using a first microcomputer included in the main computer unit by controlling an output voltage level of the first controller based on the received first reference signal;
generating a second reference signal by a second reference signal generator used for distortion control of the picture signal; and
sending the second reference signal and the picture signal in common to at least one user unit having a second controller and a second microcomputer, allowing the at least one user unit to output the second reference signal by controlling an output voltage of the second controller based on receiving the second reference signal.

9. The method as claimed in claim 8, wherein main computer unit remotely controls at least one user unit, controlling the output voltage of the second controller and the distortion of the picture signal.

* * * * *